United States Patent [19]

Koehler et al.

[11] Patent Number: 4,992,988

[45] Date of Patent: Feb. 12, 1991

[54] UNDERWATER ACOUSTIC CONTROL SYSTEM

[75] Inventors: Russell K. Koehler, Hyattsville, Md.; Glenn A. McLeod, Washington, D.C.

[73] Assignee: The United States of America as represented by the Secretary of the Navy, Washington, D.C.

[21] Appl. No.: 421,364

[22] Filed: Nov. 29, 1973

[51] Int. Cl.[5] .............................................. H04B 1/59

[52] U.S. Cl. .......................................... 367/2; 367/135

[58] Field of Search ....................... 340/5 R, 16 C, 15; 102/18, 427; 367/2, 135

[56] References Cited

U.S. PATENT DOCUMENTS

| | | | |
|---|---|---|---|
| 3,572,244 | 3/1971 | Garber | 102/18 |
| 3,638,174 | 1/1972 | Haase et al. | 340/5 R |
| 3,741,124 | 6/1973 | Visk | 340/16 C |
| 3,742,440 | 6/1973 | Ehrlich et al. | 340/5 R |

*Primary Examiner*—Thomas H. Tarcza
*Assistant Examiner*—Daniel T. Pihulic
*Attorney, Agent, or Firm*—Kenneth E. Walden

[57] ABSTRACT

An underwater acoustic control system for use in a subsurface unit receiving coded signals. A hydrophone receives the signal and enables an electronics package to supply a control pulse which could activate a switch or fire a squib. A timer is included in the package to provide a delayed turn-on of the receiver circuit for as long a period as desired.

2 Claims, 1 Drawing Sheet

UNDERWATER ACOUSTIC CONTROL SYSTEM

BACKGROUND OF THE INVENTION

The present invention pertains generally to acoustics and more specifically to underwater control systems.

In the sub-surface mooring of ordnance devices, such as mines, torpedo, and the like, it is desirable to control the functioning of these devices from the surface. Prior systems for underwater control have included cable linked control systems, preset timer activated control systems, and conventional acoustic control systems.

The disadvantage of the cable-linked control systems is that they require physical cables from the sub-surface mooring to a support vessel. This type of device is vulnerable to cable damage by both storms and ship motion. Also, the cost of keeping a ship on station for long periods of time would be prohibitive.

The disadvantage of the preset timer-activated control systems is a lack of flexibility in activating the device. For instance, this system might be preset to release a sub-surface mooring after one month. If the weather happens to be too stormy for a vessel to attempt the recovery, the mooring would probably be lost.

The conventional acoustic control systems that have been in use for the last several years have demonstrated reliable operation and have proved their usefulness for many undersea control tasks. These conventional acoustic control systems however are typically packaged in sizable pressure housings which may vary in weight from 40 to 130 pounds in air. These pressure housings are usually attached to, or form an integral part of, the anchor cable of the sub-surface mooring. The bulk of these older acoustic control systems and their attachment location place limitations on their use. These limitations are particularly apparent when the acoustic control system is to be used for the testing of underwater ordnance. The fact that most sub-surface moored ordnance are either dropped from an aircraft or launched from a submarine's torpedo tube precludes the attachment of a separate pressure housing. In addition, it is impossible to attach the acoustic control housing between the anchor and the ordnance device to be moored since the ordnance device, cable, and anchor are typically launched as a single package. Further, the conventional acoustic control systems fail to use coding methods so that unauthorized signal are often interpreted as control input signals.

SUMMARY OF THE INVENTION

The present device overcomes the disadvantages and limitations of the prior art by providing a coded underwater control system. The system includes a tone decoder which is responsive only to signals falling into a narrow range of frequencies. Signals falling within this range are applied to a code clock and a logic gate network. Pulses produced by the code clock are used by the logic gate network to time decode the input signals. If the input signals are found to have the improper timing a reset signal is applied to the code clock. However, if the input signals are properly time coded a valid command pulse is produced by the command circuit. An electronic arming delay circuit is also included in the circuitry.

It is therefore the object of the present invention to provide an improved underwater control system.

It is also the object of the present invention to provide an underwater control system which is acoustically controlled.

Another object of the invention is to provide an underwater control system which can be activated from the surface.

Another object of the invention is to provide an underwater control system which is light and compact.

Another object of the invention is to provide an underwater control system that is responsive only to acoustic signals of a certain frequency and time spacing.

Other objects, advantages and novel features of the invention will become apparent from the following detailed description of the invention when considered in conjunction with the accompanying drawing wherein:

BRIEF DESCRIPTIONS OF THE DRAWINGS

DETAILED DESCRIPTION OF THE PRE-PREFERRED EMBODIMENT

Figure 1:
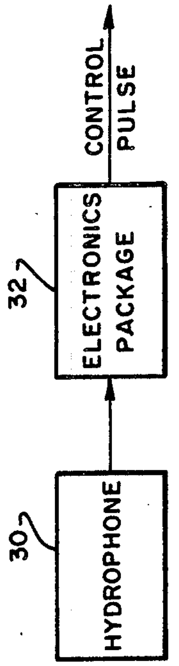
FIG. 1 is a block diagram of the structural components of the preferred embodiment.

As viewed in FIG. 1 the underwater control system is composed of two elements; a hydrophone 30 and an electronics package 32. The electronics package 32 generates a control pulse in response to a preset series of coded signals detected by the hydrophone 30. The control pulse initiates various functions within a moored device such as actuating switches firing squibs to release underwater ordnance devices from their anchor cables.

Figure 2:
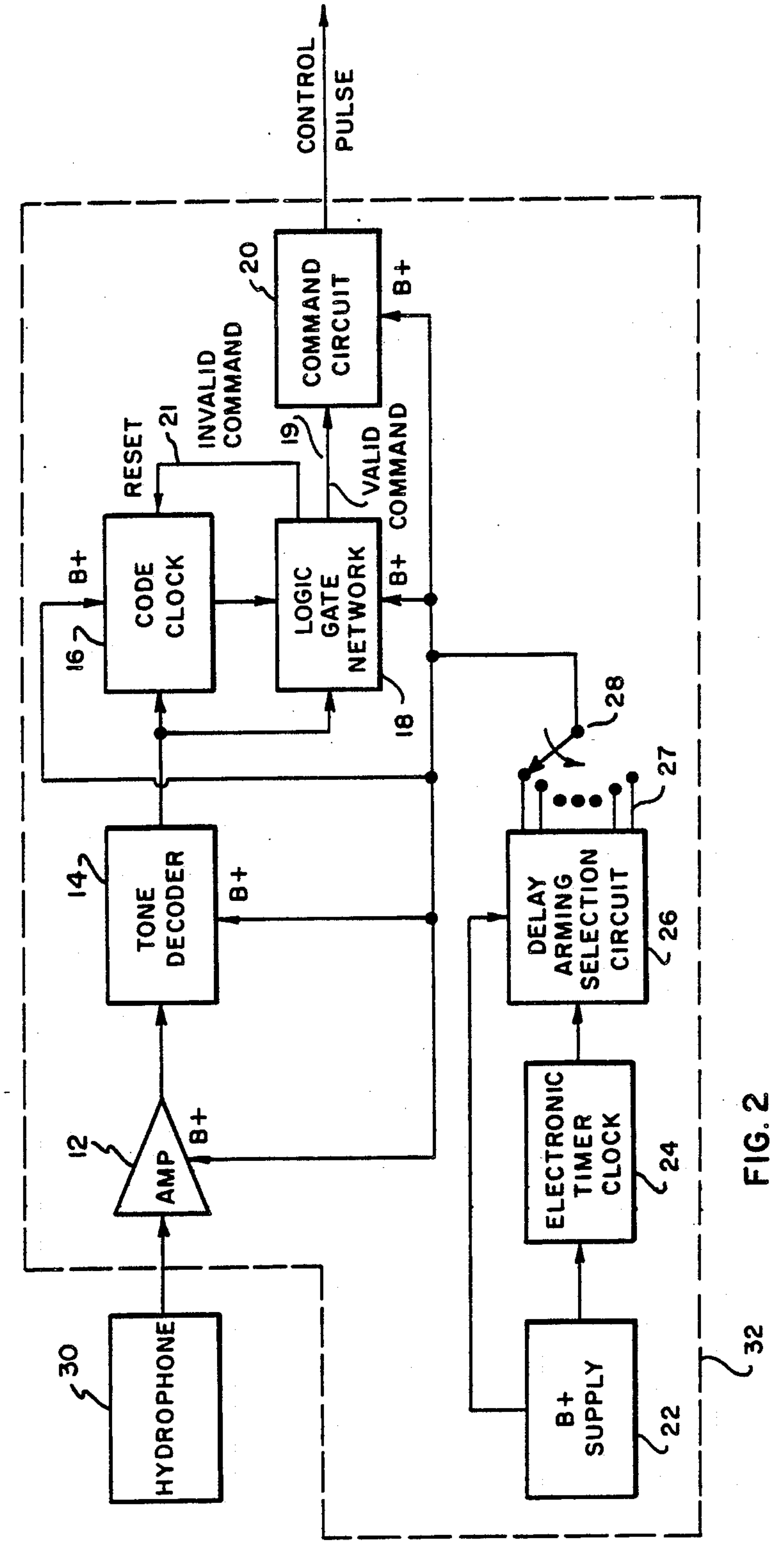
FIG. 2 is a block diagram of the functional components of the preferred embodiment.

FIG. 2 is a block diagram of the functional components of the preferred embodiment. Hydrophone 30 is connected directly to an amplifier 12 which increases the signal level of the acoustic signals detected by the hydrophone 30. Tone decoder 14 filters out those input signals from amplifier 12 which do not fall within a preset range of frequencies. Those signals that do fall in this preset range are applied to a code clock 16 and a logic gate network 18. Code clock 16 produces clock pulses upon detecting an output from the tone decoder 14 which are applied to logic gate network 18. The train of clock pulses act to set the logic circuitry of the logic gate network 18 which produces a valid command signal 19 upon detecting a properly time coded set of tone pulses from the tone decoder 14, If these input pulses are improperly time coded or extra pulses are detected, the logic gate network 18 produces an invalid command signal 21 which is applied to the code clock 16 to recycle its operation for the next series of input pulses. Valid command pulse 19 activates a command circuit 20 which can take the form of any type of switching device desired for the particular intended use or uses.

Also shown in FIG. 2 is power supply section for delayed arming of the device. Included is a power supply 22 which supplies an electric potential to the circuits as shown upon activation via the delay arming selection circuit 26. The electronic timer clock 24 accumulates clock pulses which are applied to the delay arming selection circuit 26 which in turn compares the accumulated count with a series of other predetermined numbers to switch on one of the outputs to delay activation by a predetermined amount corresponding to the selected line. Thus by selecting via switch 28, one of the outputs 27 of the delay arming device 26, one can selectively delay the activation of the underwater control device. Accordingly, the battery supply 22 will not be run down if the control device is not intended to be used for some extended period after it is deployed.

The principle advantage of this invention is its small size. This allows it to be contained as a part of the item being tested without compromising the test. This small size is made possible by utilizing state-of-the-art linear and digital integrated circuits in the electronics design. The electronic timer 24, the logic gate network 18 and code clock 16 of this invention all use COSMOS (Complementary-Symmetry Metal-Oxide Semiconductor) integrated circuits. These COSMOS devices require very little current to operate. As a result, the space taken up by the batteries of this invention has been reduced considerably compared to previous designs.

Obviously many modifications and variations of the present invention are possible in light of the above teachings. For example, although the present invention was designed for releasing underwater ordnance devices it could be used to control any type of underwater device which is designed to respond to control pulses It is therefore to be understood that within the scope of the appended claims the invention may be practiced otherwise than as specifically described.

What is claimed as new and desired to be secured by Letters Patent of the United States is:

1. An underwater control device which is responsive to acoustic signals for producing a control pulse comprising:

means for detecting said acoustic signals and producing electronic signals representative thereof;

tone decoder means for conducting said electronic signals having a frequency falling within a predetermined range;

code clock means responsive to said conducted electronic signals for producing logic setting signals;

logic network means responsive to said logic setting signals for detecting the time interval spacing of said conducted electronic signals and providing an invalid command pulse to reset said code clock means upon detecting said conducted electronic signals which do not fall into said predetermined time intervals and producing a valid command pulse upon detecting said conducted electronic signals which do fall into said predetermined time intervals command circuit means for producing a control signal responsive to the detection of said valid command pulse; and, delayed activating means for selectively delaying the activation of said underwater control device.

2. The device of claim 1, wherein said delayed activating means comprises:

a power supply;

an electronic timer clock connected to said power supply for accumulating clock pulses;

delaying arming selection means for sequentially applying power from said power supply to a series of output lines as a sequentially higher number of accumulated clock pulses are detected from said electronic timer clock.

* * * * *